Jan. 10, 1967 S. K. BOYAJIAN Re. 26,142

ENVELOPES AND THE LIKE WITH REMOISTENABLE ADHESIVE COMPRISING POLYVINYL ALCOHOL

Original Filed Sept. 4, 1953

Selrak K. Boyajian
INVENTOR.

United States Patent Office

Re. 26,142
Reissued Jan. 10, 1967

26,142

ENVELOPES AND THE LIKE WITH REMOISTENABLE ADHESIVE COMPRISING POLYVINYL ALCOHOL

Setrak Krikor Boyajian, P.O. Box 973, Worcester, Mass. 01601

Original No. 2,804,395, dated Aug. 27, 1957, Ser. No. 378,683, Sept. 4, 1953. Application for reissue June 9, 1959, Ser. No. 818,990
17 Claims. (Cl. 117—44)

Figures 1, 2:
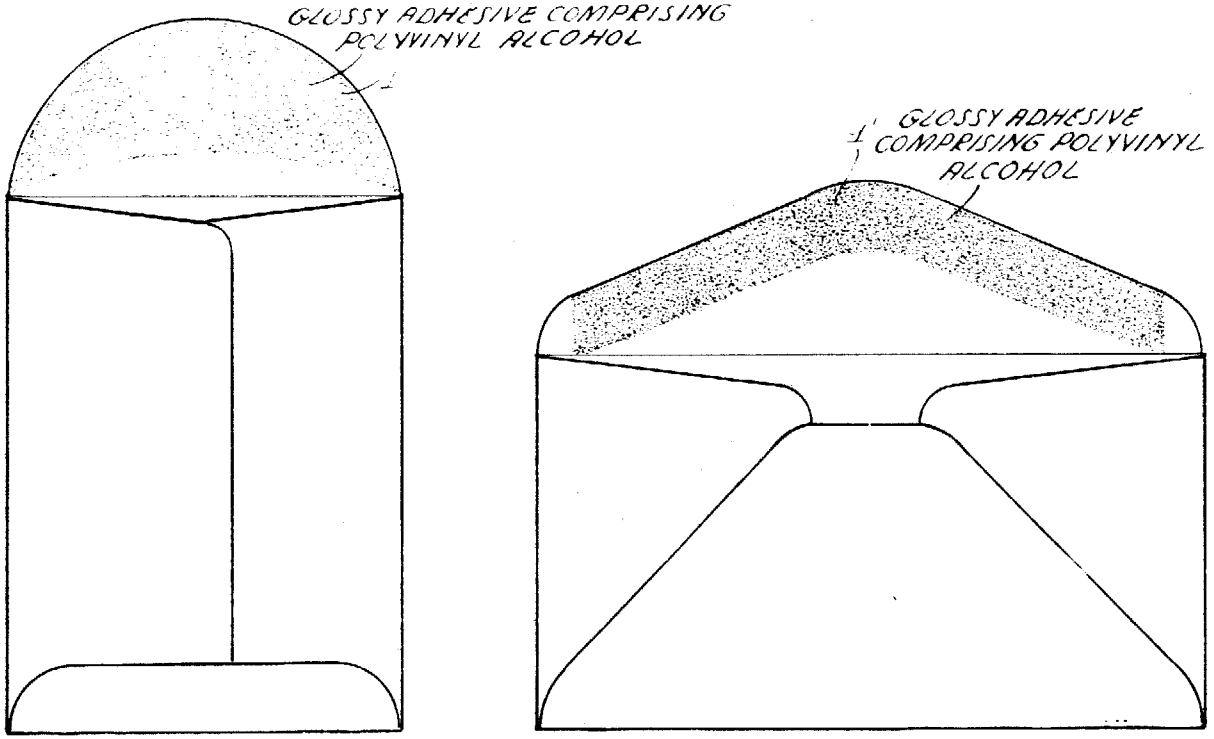

Matter enclosed in heavy brackets [ ] appears in the original patent but forms no part of this reissue specification; matter printed in italics indicates the additions made by reissue.

My invention relates to envelopes having remoistenable gummed seal flaps, gummed paper, postage stamps, labels, and the like.

Hitherto, envelope seal gum has, almost exclusively, consisted of dextrin, in its numerous modifications, by itself in water, or in mixture with acids, alkalies, solvents, and plasticizers, according to the kind of paper it was designed to stick. But dextrin by itself forms, upon drying from its watery solution, a very brittle and distorted film which soon begins to check and crack, and lose much of its adhesive properties even for very soft and easy to stick papers; and when mixed with, or reacted upon by, the materials and chemicals above mentioned, it will, while freeing itself from some of the foregoing objections, acquire thereby numerous other objectionable features, such as discoloring the paper and giving the gum an unwholesome taste, so that, before my invention, the envelope industry had openly recognized the fact that a fully satisfactory envelope seal gum did not exist, particularly for the sticking of harder papers, such as bond, kraft, etc.

One object of my invention is to provide an envelope seal flap that is free of all the materially objectionable features of hitherto produced envelope seal flaps.

A second object of my invention is to provide an envelope seal flap that will firmly and permanently stick all grades of envelope paper, whether soft or hard, including bond, kraft, linen and others of greater or lesser hardness, without the aid of acids, alkalies, or solvents.

A third object of my invention is to provide an envelope seal flap that is free of any odor, and one that possesses a wholesome, pleasant taste.

A fourth object of my invention is to provide an envelope seal flap that is non-checking, non-cracking, and non-curling, and one that will lie smoothly flat, while unsealed, over the body of the envelope without the aid of any chemical plasticizers.

A fifth object of my invention is to provide an envelope seal flap that is materially colorless permanently, and one that will not materially stain or discolor regardless of the kind of paper used in making the envelope.

A sixth object of my invention is to provide an envelope seal flap that is highly resistant to, and is not materially affected by, atmospheric conditions, such as high humidity and extreme dryness, and one that is materially non-blocking; also an envelope seal flap that will, after it has been sealed down, neither "wet-out" by atmospheric moisture and come open, nor "dry-out" by extreme atmospheric dryness and also come open, but will remain firmly stuck under all climatic conditions.

A seventh object of my invention is to provide an envelope seal flap that will not materially lick-out or wash-out in remoistening, and one that will not materially clog the wetting blade or wetting brush of the envelope sealing machine.

An eighth object of my invention is to provide an envelope seal flap that will adhere down quickly upon being remoistened and closed down.

A ninth object of my invention is to provide an envelope seal gum that will run clean on the applicable envelope machines as they now exist, or as may be designed and developed in the future.

A tenth object of my invention is to provide an envelope seal flap which possesses a combination of all the properties enumerated in the foregoing objects, together with other desirable properties incidental thereto and coexistent therewith; an envelope seal flap so combining these properties having been only a wishful thinking on the part of the envelope industry, never having been achieved before my invention.

An eleventh object of my invention is to provide an envelope seal gum which is, its higher qualities notwithstanding, economical because it will give greater "mileage," requiring both a thinner and narrower film for highly effective sticking. Other objects of my invention will appear hereinafter.

Referring to the drawings, FIGURES 1 and 2, respectively, illustrate open-end and open-side envelopes of the conventional design, showing the seal flaps having on the marginal portions thereof a layer of remoistenable adhesive coating composition having as its essential ingredient polyvinyl alcohol, as shown at 1, and 1′, and as it is described hereinafter.

With the above-enumerated objects as the goal, it was long since found by this applicant that sources other than dextrin or other starch gums must be brought into use for the production of a completely satisfactory envelope seal gum. A water soluble plastic with a high tensile strength and structural stability seemed to be the answer, and polyvinyl alcohol appeared to be the most promising material for the purpose. But polyvinyl alcohol, even in its most advanced methods of production, is not a sufficiently pure product in its raw state so that it may be employed as an envelope seal gum: for, while given types of polyvinyl alcohol have been offered as remoistenable adhesive, this applicant has found that even extremely small quantities of contaminants will have a very decisive influence upon the permanence of the remoistenability of such adhesives, and even if this condition is permissible for some uses, an envelope seal is not one of them, for if the seal flaps of a lot of envelopes become non-remoistenable as time passes, then it becomes so much scrap paper, unless the seal flaps can be regummed, at an almost prohibitive expense, and the envelopes sold as seconds at greatly reduced prices.

It was, at the time, believed that if the permanence of remoistenability could be assured, a selected grade of remoistenable polyvinyl alcohol could satisfy the need for a long sought-after completely suited envelope seal gum, as it seemed to possess all of the remaining properties needed for the purpose. It was also believed that the said selected grade could be made into a permanently remoistenable envelope seal gum if its was freed from the aforementioned contaminants. Consequently, all efforts were focused in that direction for the time being.

But when, after an exhaustive investigation, the desired purity of the selected remoistenable polyvinyl alcohol was obtained, it was found that the resultant gum, while a decided improvement over the hitherto existing envelope seal gums, fell somewhat short of achieving the full combination of the objects hereinbefore enumerated. For example, while, when purified the remoistenability was made more permanent, the resultant gum showed considerable operating unstability, varying from lot to lot of the raw product, and even from batch to batch of the water solution from the same lot of the raw product—in tack, in running and sticking properties, in viscosity, etc.

Yet with all these, remoistenable polyvinyl alcohol still held the biggest promise for an ideal envelope seal gum. Its lack of operating stability as well as uniformity was the first drawback to be overcome. It was then found that while the selected remoistenable polyvinyl alcohol as such did not wholly combine all of the properties desired for an ideal envelope seal gum, some of its modifications, chemical or physical, would do so.

Chemically, hitherto, starch, dextrin, and casein have been suggested as extenders, and glycerin and glycols as plasticizers, for polyvinyl alcohol. Several processes of sulphating and borating of polyvinyl alcohol have been patented. Another patent covers a remoistenable adhesive with a complex formula containing sulphite waste, wetting agent, polyvinyl alcohol, aluminum sulphate and water. None of the above processes and formulas have reported the use of polyvinyl alcohol, pure or modified, as an envelope seal gum, nor have others within my knowledge before my invention.

An envelope seal gum, above all, has to lend itself to automatic operation, as well as compatibility with a large variety of hard-to-stick, color sensitive, papers. It must, for example, possess sufficient tack, but must not materially cotton or string in operation, and possess all of the properties suggested in the objects hereinabove. These ends, I found, could be best realized with a product of extreme structural simplicity and integrity. It was then found that these properties could be obtained by selecting cane sugar as the chemical modifier and boiling, in aqueous solution, as the physical modifier.

For example, one hundred pounds of dry remoistenable polyvinyl alcohol of approximately eight cps. viscosity and one hundred and thirty saponification number is dissolved in three hundred and fifty pounds of hot water in a suitable jacketed kettle, with a moderately low-speed mixer, and the temperature is brought up to slow boiling and kept there under slow agitation for approximately one hour, and as long thereafter as needed for the complete disappearance of all the lumps, if any, and a uniform solution results, with all the volatile impurities distilled off therefrom. Thereupon one hundred pounds of granulated cane sugar is gradually added and digested in the batch and the temperature is brought to two hundred degrees F., or slightly under, and kept there for about ten minutes; then the heater and the mixer are turned off.

Where the desired structural simplicity, integrity, and workability of the polyvinyl alcohol solution is obtained by the boiling alone, then cane sugar may be omitted.

It must be remembered that the foregoing procedures and formulas are only examples, and admit wide degrees of variations, polyvinyl alcohol in each case being an essential ingredient, and admit further additions.

The envelope seal gum herein described is also ideal for coating paper, as well as gummed labels, postage stamps, and gummed tapes.

Various grades and brands of polyvinyl alcohol differ so widely in their inherent properties that often there appears nothing common among them other than the name. This difference often occurs even among the various lots of the same brand and grade, though in a lesser degree. The difference is more often physical than chemical. The former is chiefly structural; the latter is largely in the nature and quantity of the contaminants. The want of uniformity may or may not be important depending upon the use the polyvinyl alcohol is to be put to. For the purpose of this invention uniformity is critical. Published descriptive data, often dealing with a single sample, have at times furnished false leads for specialized objective investigation. For example, during my investigations in the interest of this invention I was frequently remineded by such descriptive data that when subjected to boiling temperatures an aqueous solution of polyvinyl alcohol would jell upon cooling. I found that while some samples of polyvinyl alcohol in 22.5% initial aqueous solution would if heated to 100 degrees C. jell on cooling, when such solution is brought to actual boiling and kept there for one hour or more, under agitation, so as to distill off all of its volatile contaminants, and precipitate all of its solid contaminants, while also breaking up the nesting or clustering of molecules or particles, a near clear, free-flowing, and viscous solution will, after settling out and cooling, result. Such boiling will give to polyvinyl alcohol a lustrous, structurally stabilized, integrated, homogenized, quicker-adherent upon remoistening, non-jelling and free-flowing while in solution, more resistant to humidity, more responsive to applied moisture, smoother, clearer, and more flexible film-forming, and quicker-drying character. Such boiling will not only provide uniformity among various lots of the same brand and grade of polyvinyl alcohol so as to give its solution a high degree of workability, even without the addition of cane sugar, but will also narrow down the hereinbefore mentioned barriers among its various brands and grades. After the first hour of prolonged boiling, there are varying degrees of increase in the tensile strength of the dry film of polyvinyl alcohol—thereafter, there is no notable change. This increase is perhaps due to molecular, particular, and/or structural integration.

I claim:

[1. An envelope having on the underside of the marginal portions of the seal flap thereof a glossy layer of remoistenable adhesive coating composition having as its essential ingredient polyvinyl alcohol, said layer being non-curing, non-blocking, non-staining, non-checking, and permanently responsive to applied moisture at any temperature, and having a wholesome, pleasant taste, and quick adherence upon remoistening and which has been deposited from homogeneous free flowing solution.]

2. An envelope having on the underside of the marginal portions of the seal flap thereof a glossy layer of remoistenable adhesive coating composition having as its essential ingredient polyvinyl alcohol which has been boiled in aqueous solution for approximately one hour and until all the lumps have disappeared and a near-clear homogeneous solution has been formed, with all volatile contaminants distilled off therefrom.

3. An envelope having on the underside of the marginal portions of the seal flap thereof a glossy layer of remoistenable adhesive coating composition having as its essential ingredient polyvinyl alcohol which has been boiled in aqueous solution for a time sufficient to give it a lustrous, structurally stabilized, integrated, homogenized, quicker adherent, non-jelling and free-flowing while in cooled solution, more resistant to humidity, more responsive to applied moisture, clearer, smoother, stronger, and more flexible film-forming, and quicker-drying, character.

4. An envelope having on the underside of the marginal portions of the seal flap thereof a glossy layer of remoistenable adhesive coating composition having as its essential ingredient polyvinyl alcohol which has been boiled in aqueous solution by dissolving in hot water in a suitable jacketed kettle having a mixer and bringing the temperature to boiling and keeping it there under agitation for approximately one hour or until all the lumps have disappeared and a near-clear, homogeneous solution has been formed, with all volatile contaminants distilled off therefrom.

[5. An envelope as claimed in claim 4 wherein cane sugar has been added to the hot aqueous solution of polyvinyl alcohol at the conclusion of said boiling.]

6. As an article of manufacture, paper having on one side thereof a glossy layer of remoistenable adhesive coating composition having as its essential ingredient polyvinyl alcohol which has been boiled in aqueous solution for a time sufficient to give it a lustrous, structurally stabilized, integrated, homogenized, quicker adherent, non-jelling and free-flowing while in cooled solution, more resistant to humidity, more responsive to applied moisture, clearer, smoother, stronger, and more flexible film-forming, and quicker-drying, character.

7. The article claimed in claim 6 wherein said paper comprises a postage stamp.

8. The article claimed in claim 6 wherein said paper comprises a label.

9. The article claimed in claim 6 wherein said paper comprises a gummed tape.

[10. The article claimed in claim 6 wherein cane sugar has been added to the hot aqueous solution of polyvinyl alcohol at the conclusion of said boiling.]

*11. An envelope having on the underside of the marginal portions of the seal flap thereof a glossy layer of remoistenable adhesive coating composition having as its essential ingredient polyvinyl alcohol which has been modified by boiling in aqueous solution for a time and at a temperature sufficient to render it substantially pure, free of all volatile contaminants, and homogeneous throughout, said layer being non-curling, non-blocking, non-staining, non-checking, and permanently responsive to applied moisture at any temperature, and having a wholesome, pleasant taste, and quick adherence upon remoistening, and which has been deposited from integrated, free-flowing, stable, viscous solution.*

*12. Paper having on at least one side thereof a glossy layer of remoistenable adhesive coating composition having as its essential ingredient polyvinyl alcohol which has been modified by boiling in aqueous solution for a time and at a temperature sufficient to render it substantially pure, free of all volatile contaminants, and homogeneous throughout, said layer being non-curling, non-blocking, non-staining, non-checking, and permanently responsive to applied moisture at any temperature, and having a wholesome, pleasant taste, and quick adherence upon remoistening, and which has been deposited from integrated, free-flowing, stable, viscous solution.*

*13. An envelope having on the underside of the marginal portions of the seal flap thereof a glossy layer of remoistenable adhesive coating composition having as its essential ingredient polyvinyl alcohol which has been modified by boiling in aqueous solution for a time and at a temperature sufficient to render it substantially pure, free of all volatile contaminants, and homogeneous throughout.*

*14. Paper having on at least one side thereof a glossy layer of remoistenable adhesive coating composition having as its essential ingredient polyvinyl alcohol which has been modified by boiling in aqueous solution for a time and at a temperature sufficient to render it substantially pure, free of all volatile contaminants, and homogeneous throughout.*

*15. An envelope having on the underside of the marginal portions of the seal flap thereof a glossy layer of remoistenable adhesive coating composition having as its essential ingredient polyvinyl alcohol which has been modified by boiling in aqueous solution under agitation for a time and at a temperature sufficient to render it substantially pure, free of all volatile contaminants, and homogeneous throughout.*

*16. Paper having on at least one side thereof a glossy layer of remoistenable adhesive coating composition having as its essential ingredient polyvinyl alcohol which has been modified by boiling in aqueous solution under agitation for a time and at a temperature sufficient to render it substantially pure, free of all volatile contaminants, and homogeneous throughout.*

*17. An envelope having on the underside of the marginal portions of the seal flap thereof a glossy layer of remoistenable adhesive coating composing having as its essential ingredient polyvinyl alcohol which has been modified by boiling in aqueous solution under agitation for a time and at a temperature sufficient to render it substantially pure, free of all volatile contaminants, and homogeneous throughout, said layer being non-curling, non-blocking, non-checking, and permanently responsive to applied moisture at any temperature, and having a wholesome, pleasant taste, and quick adherence upon remoistening, and which has been deposited from integrated, free-flowing, stable, viscous solution.*

*18. Paper having on at least one side thereof a glossy layer of remoistenable adhesive coating composition having as its essential ingredient polyvinyl alcohol which has been modified by boiling in aqueous solution under agitation for a time and at a temperature sufficient to render it substantially pure, free of all volatile contaminants, and homogeneous throughout, said layer being non-curling, non-blocking, non-staining, non-checking, and permanently responsive to applied moisture at any temperature, and having a wholesome, pleasant taste, and quick adherence upon remoistening, and which has been deposited from integrated, free-flowing, stable, viscous solution.*

*19. An envelope having on the underside of the marginal portions of the seal flap thereof a glossy layer of remoistenable adhesive coating cimposition having as its essential ingredient polyvinyl alcohol which has been modified by boiling in aqueous solution under agitation at a temperature sufficient to render it substantially pure, free of all volatile contaminants, and homogeneous throughout.*

*20. Paper having on at least one side thereof a glossy layer of remoistenable adhesive coating composition having as its essential ingredient polyvinyl alcohol which has been modified by boiling in aqueous solution under agitation at a temperature sufficient to render it substantially pure, free of all volatile contaminants, and homogeneous throughout.*

References Cited by the Examiner

The following references, cited by the Examiner, are of record in the patented file of this patent or the original patent.

UNITED STATES PATENTS

| | | | |
|---|---|---|---|
| 746,397 | 12/1903 | Snavely | 117—14 |
| 1,449,792 | 3/1923 | Swift | 229—68 |
| 1,603,809 | 10/1926 | Seacord | 226—68 |
| 2,135,075 | 11/1938 | Herrmann | 260—91.3 |
| 2,162,618 | 6/1939 | Izard | 260—91.3 |
| 2,275,578 | 3/1942 | Wood | 260—17.4 |
| 2,348,220 | 5/1944 | Kline | 117—155 |
| 2,419,281 | 4/1947 | Noble | 260—29.6 |
| 2,491,642 | 12/1949 | Brant | 260—29.6 |
| 2,576,820 | 11/1951 | Barnes | 260—29.6 |
| 2,577,821 | 12/1951 | Smith et al. | 117—122 |
| 2,579,483 | 12/1951 | Fenn | 260—17.4 |
| 2,595,928 | 5/1952 | Currie et al. | 252—358.7 |
| 2,648,645 | 8/1953 | Borris et al. | 260—29.6 |

FOREIGN PATENTS 386,161 1/1933 Great Britain.

OTHER REFERENCES

Del Monte: Technology of Adhesives, 1947, pages 127, 128, 140.

"Elvanol," E. I. du Pont de Nemours and Co., 1947 (pages 4–7, 15, 25–28, 31, 36–39 and 43 relied upon).

Du Pont Technical Data Bulletin 1–1043, PVA Electrochemicals Dept., E. I. du Pont de Nemours and Co., filed U.S. Patent Office, Nov. 13, 1943.

Scientific American, February 1944, pages 76–77.

LEON J. BERCOVITZ, *Primary Examiner.*

RICHARD D. NEVIUS, JOSEPH B. SPENCER, DAN ARNOLD, DONALD E. CZAJA, *Examiners.*

W. D. MARTIN, E. B. WOODRUFF, G. W. RAUCHFUSS, *Assistant Examiners.*

Dedication

Reissue No. 26,142.—*Setrak K. Boyajian*, Worcester, Mass. ENVELOPES AND THE LIKE WITH REMOISTENABLE ADHESIVE COMPRISING POLYVINYL ALCOHOL. Reissue Patent dated Jan. 10, 1967. Dedication filed October 17, 1968, by the assignee, *E. I. du Pont de Nemours and Company.*

Hereby dedicates to the Public all of the remaining term of said patent. [*Official Gazette March 4, 1969.*]